United States Patent
Sun et al.

(10) Patent No.: US 7,289,299 B1
(45) Date of Patent: Oct. 30, 2007

(54) AIR BEARING SLIDER WITH THREE-PROJECTION TRAILING CENTER PAD

(75) Inventors: Biao Sun, Fremont, CA (US); Forhad Hossain, Fremont, CA (US); Ji-Feng Ying, San Jose, CA (US); Eric T. Sladek, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 380 days.

(21) Appl. No.: 11/050,536

(22) Filed: Feb. 2, 2005

(51) Int. Cl.
*G11B 5/60* (2006.01)
(52) U.S. Cl. .................... 360/235.7; 360/237
(58) Field of Classification Search .......... 360/235.7, 360/236.5, 236.3, 237
See application file for complete search history.

(56) References Cited

U.S. PATENT DOCUMENTS

| | | | |
|---|---|---|---|
| 6,021,020 A * | 2/2000 | Itoh et al. ............... | 360/236.1 |
| 6,188,547 B1 * | 2/2001 | Gui et al. ............... | 360/236.5 |
| 6,344,949 B1 * | 2/2002 | Albrecht et al. ......... | 360/236.5 |
| 6,606,222 B1 * | 8/2003 | Ryun ...................... | 360/236.5 |
| 6,661,611 B1 * | 12/2003 | Sannino et al. ......... | 360/236.3 |
| 6,710,964 B1 * | 3/2004 | Rao et al. ................ | 360/75 |
| 6,956,719 B2 * | 10/2005 | Mundt et al. ............ | 360/236.3 |
| 6,989,967 B2 * | 1/2006 | Pendray et al. .......... | 360/236.5 |
| 7,154,709 B2 * | 12/2006 | Rao et al. ................ | 360/235.8 |
| 2002/0030938 A1 | 3/2002 | Boutaghou et al. | |
| 2002/0063996 A1 * | 5/2002 | Berg ....................... | 360/236.5 |
| 2002/0067575 A1 * | 6/2002 | Brand et al. ............. | 360/235.6 |
| 2002/0071216 A1 | 6/2002 | Sannino et al. | |
| 2003/0231429 A1 * | 12/2003 | Boutaghou et al. ...... | 360/235.8 |
| 2005/0264913 A1 * | 12/2005 | Ruiz .......................... | 360/75 |
| 2006/0023358 A1 * | 2/2006 | Huang ..................... | 360/235.6 |
| 2007/0121251 A1 * | 5/2007 | Yoshida ................... | 360/236.3 |

* cited by examiner

*Primary Examiner*—Jefferson Evans
(74) *Attorney, Agent, or Firm*—Joshua C. Harrison, Esq.

(57) ABSTRACT

A novel air bearing can be used in a magnetic hard disk drive or other information storage device. The novel air bearing includes a central cavity having a bottom surface, a leading pad adjacent to the central cavity, a trailing center pad having a top surface, and two inter-projection step regions. The trailing center pad has an aft region adjacent to the transducer and three projections extending from the aft region towards the central cavity. The central cavity separates the three projections from the leading pad. Each of the two inter-projection step regions lies at least partially between the projections, and each includes a surface at an intermediate level between a level of the top surface and the level of the bottom surface. The novel air bearing may be adequately insensitive to one or more factors affecting flying height variation in a micro-drive utilizing ramp load/unload of the slider.

11 Claims, 3 Drawing Sheets

AIR BEARING SLIDER WITH THREE-PROJECTION TRAILING CENTER PAD

BACKGROUND OF THE INVENTION

1. Field of the Invention

The present invention relates generally to the field of information storage devices, and more particularly to air bearing sliders used in such devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

Recently the demand for smaller information storage devices has motivated the development of so-called micro-drives. Typically micro-drives are information storage devices that have been miniaturized and that therefore have smaller spinning disks than conventional devices. For example, a micro-drive may have disks with a diameter of less than 30 mm.

FIG. 1 illustrates a micro-drive having several conventional features. The disk drive includes a head disk assembly (HDA) 10 and a printed circuit board assembly (not shown). The HDA 10 houses at least one magnetic disk 12 having radius 14. The disk 12 contains a plurality of magnetic tracks for storing data. The tracks are typically disposed upon opposing first and second disk surfaces of the disk 12 that extend between an inner disk edge (associated with the inner diameter) and an outer disk edge (associated with the outer diameter) of the disk 12. The head disk assembly further includes a spindle motor 16 for rotating the disk 12. The spindle motor 16 includes a spindle motor hub that is rotatably attached to the HDA 10. The hub may have an outer hub flange that supports a lowermost one of the disks. Additional disks may be stacked and separated with one or more annular disk spacers that are disposed about the hub.

The HDA 10 further includes a head stack assembly HSA 20 rotatably attached to the HDA 10. The HSA 20 includes at least one head 26 for reading and writing data from and to the disk 12. The HSA 20 includes a bore, and the HSA 20 further includes a pivot bearing cartridge 22 engaged within the bore for facilitating the HSA 20 to rotate relative to HDA 10. The HSA 20 further includes a coil support 24 that extends from one side of the HSA 20 opposite head 26. The coil support 24 is configured to support a coil through which a changing electrical current is passed. The coil interacts with one or more magnets (not shown) that are attached to HDA 10, to form a voice coil motor for controllably rotating the HSA 20. The printed circuit board assembly (not shown) includes a servo control system for generating servo control signals to control the current through the coil and thereby position the head stack assembly 20 relative to tracks disposed upon surfaces of disk 12.

In a magnetic hard disk drive, the head 26 typically comprises a body called a "slider" that carries a magnetic transducer on its trailing end. The magnetic transducer typically includes an inductive write element and a magneto resistive read element. In a magnetic hard disk drive, the transducer is typically supported in very close proximity to the magnetic disk by a hydrodynamic air bearing. As the motor 16 rotates the magnetic disk 12, the hydrodynamic air bearing is formed between an air bearing surface of the slider of head 26, and a surface of the magnetic disk 12. The thickness of the air bearing at the location of the transducer is commonly referred to as "flying height."

Magnetic hard disk drives, like the micro-drive described in the paragraphs above, however, are not the only type of information storage devices that have utilized air bearing sliders. For example, air bearing sliders have also been used in optical information storage devices to position an objective lens over non-magnetic media for optical read-back of data.

Since the flying height is a key design parameter that affects the performance of an information storage device, it is important that it not vary excessively during operation. The flying height, and therefore the spacing between the transducer or objective lens and the disk surface, depends strongly on the design of the air bearing surface. Optimally the flying height would remain constant at a desired value, but that is not achieved in practical devices. Manufacturing variations changes in the operating environment, or changes in the position of the air bearing surface of the slider tend to cause undesirable changes in flying height.

One environmental factor that can cause an undesirable change in flying height is the ambient pressure of the atmosphere. The ambient pressure is lower at high altitudes than at sea level, yet an information storage device must be designed to operate in both environments. An air bearing that is designed to minimize the effect of this environmental factor on flying height is said to have enhanced "altitude insensitivity." A cavity that creates a region of sub-ambient pressure is an air bearing design feature that has been known in the past to enhance altitude insensitivity.

An example of a manufacturing variation that can cause an undesirable change in flying height is the longitudinal out-of-plane curvature of the air bearing surface, commonly known as the "crown" of the air bearing surface. An air bearing that is designed to minimize the effect of this manufacturing variation on flying height is said to have enhanced "crown insensitivity." Lateral out-of-plane curvature of the air bearing surface can also vary in manufacturing. An air bearing that is designed to minimize the effect of this manufacturing variation on flying height is said to have enhanced "camber insensitivity." Such enhanced crown insensitivity and camber insensitivity also tends to reduce flying height variation due to curvatures that may be present in the spinning disk surface.

Another example of a manufacturing variation that can cause an undesirable change in flying height is the pre-load force (also known as "gram load") that presses the air bearing slider against the spinning disk surface during operation. An air bearing that is designed to minimize the effect of this manufacturing variation on flying height is said to have enhanced "gram load insensitivity".

An undesirable change in flying height can also result from a change in the linear velocity of the disk surface that is experienced by the air bearing slider during operation. Although the spindle motors that rotate the disk or disks in information storage devices are typically able to control the angular velocity of the spinning disk within a tight tolerance, the linear velocity of the disk surface at the outer diameter (OD) of the disk is typically much higher than the linear velocity of the disk surface at the inner diameter (ID) of the disk. As a result, the flying height may tend to vary depending on the radial position of the slider relative to the disk. An air bearing that is designed to minimize the effect on flying height due to a change in linear disk velocity is said to have an acceptably "flat flying height profile."

The miniaturization that is characteristic of micro-drives exacerbates several of the challenges to air bearing design. For example, in a micro-drive the linear velocity of the miniaturized disk at the ID is relatively low compared to that in a conventional disk drive. Micro-drives may also employ miniaturized recording heads, for example comprising so-called "pico" sliders or "femto" sliders. Such sliders make available a smaller total footprint for the air bearing surface than larger sliders, and therefore confine air bearing design to a smaller physical space. The resulting reduction in slider length challenges air bearing designers to give the air bearing adequate pitch stiffness to resist applied pitch torques. The resulting reduction in air bearing width challenges air bearing designers to give the air bearing adequate roll stiffness to resist applied roll torques.

Micro-drives also typically must be designed to survive high acceleration mechanical shocks because they are destined for use in consumer electronic devices that are portable. To meet such a survival specification, the micro-drives almost invariably employ a ramp to load/unload recording heads to/from proximity to the surface of the disk when the micro-drive is powered on/off. Ramp load/unload presents additional challenges to the air bearing designer. For example, to avoid damage to the disk surface during ramp loading, it is important that the air bearing establish itself quickly despite any initial pitch bias and/or initial roll bias that would otherwise tend to bring the slider corners in contact with the disk surface. Furthermore, to facilitate unloading it is desirable that the air bearing allows the slider to be easily lifted off the slider from the disk surface (despite any negative pressure regions of the air bearing).

Therefore, what is needed in the art is an air bearing design that can provide an adequately flat flying height profile, for example in a micro-drive information storage device utilizing ramp load/unload of the slider, and is adequately insensitive to one or more factors affecting flying height variation.

DETAILED DESCRIPTION OF EXEMPLARY EMBODIMENTS

Figure 1:
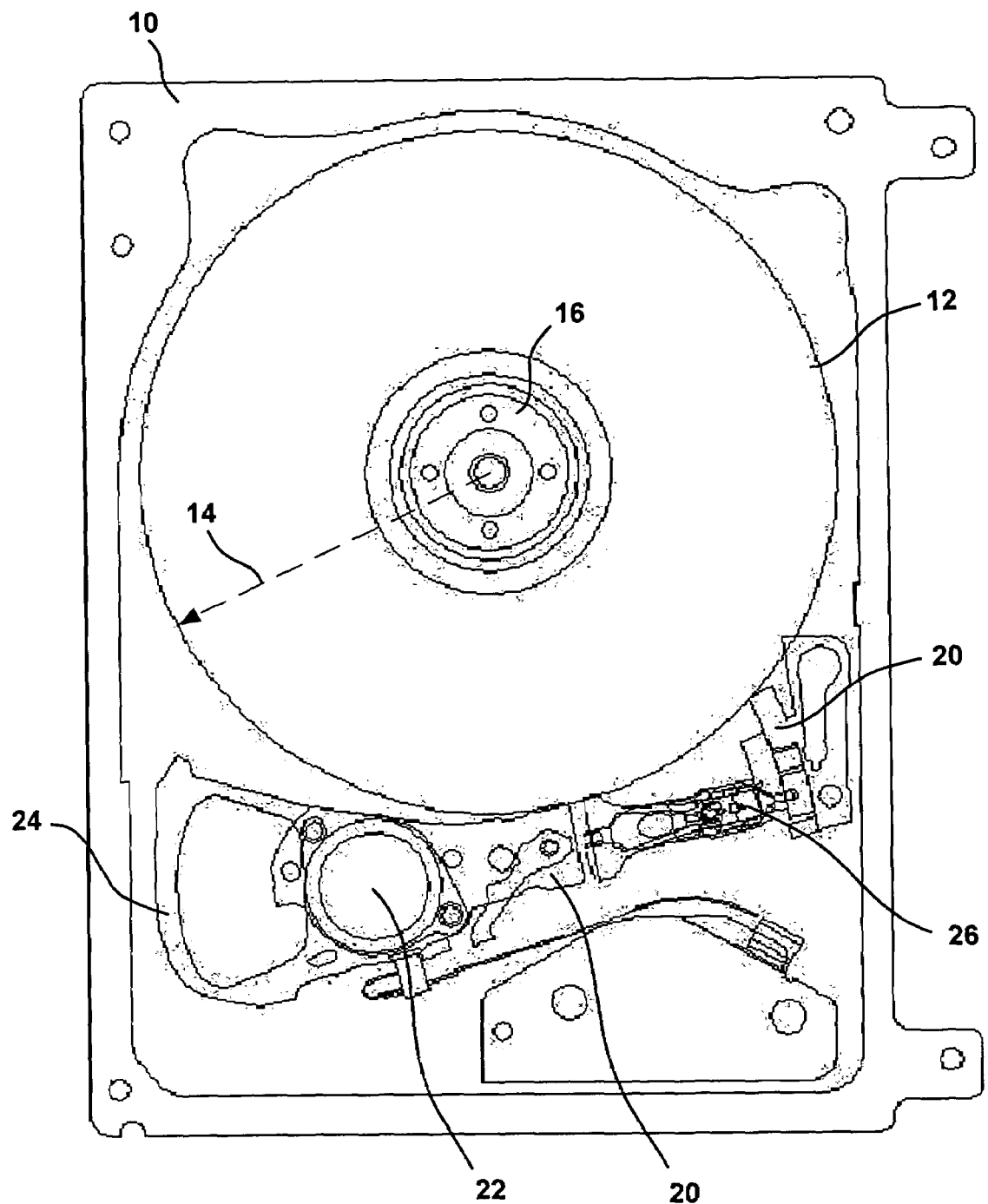
FIG. 1 is a diagram of an exemplary micro-drive type information storage device.
Figure 2:
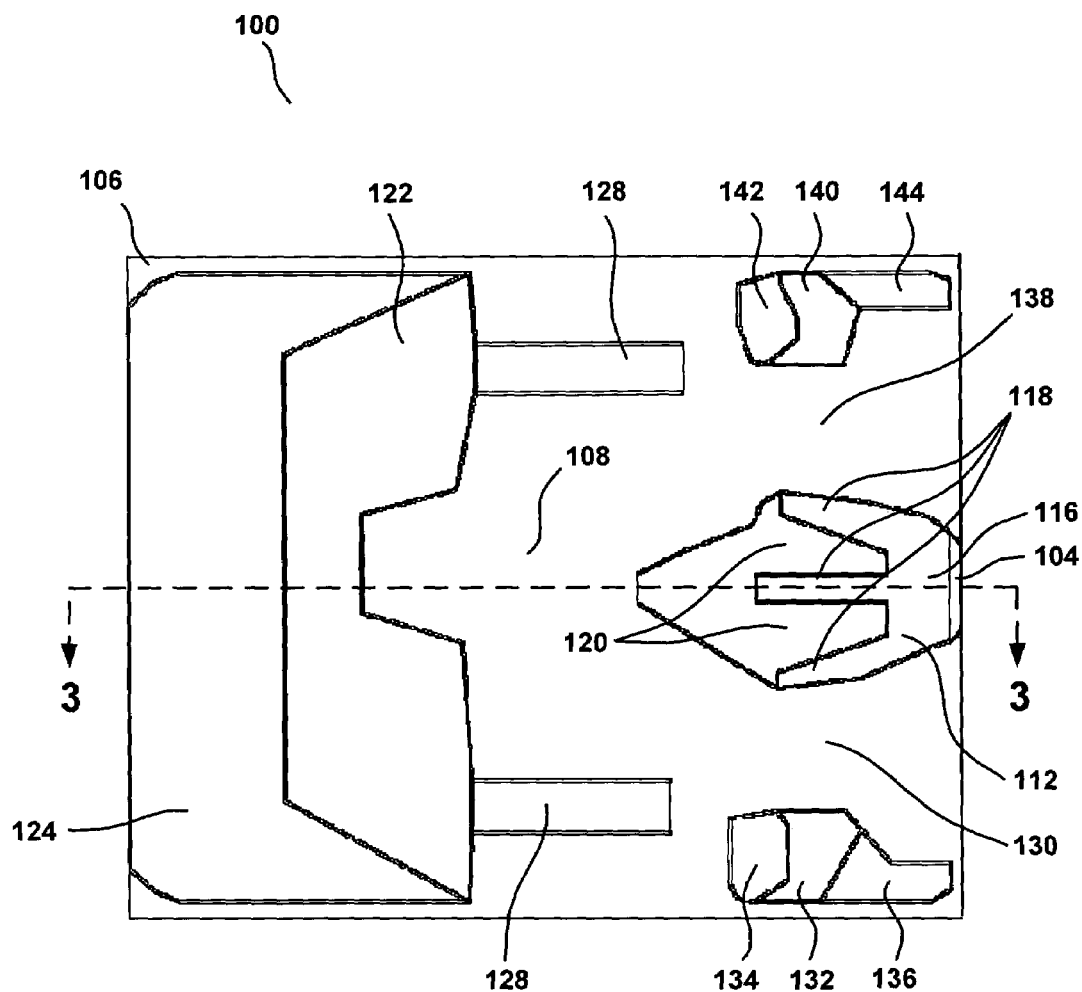
FIG. 2 is an air bearing surface view of a head according to an exemplary embodiment of the present invention (not necessarily to scale).
Figure 3:
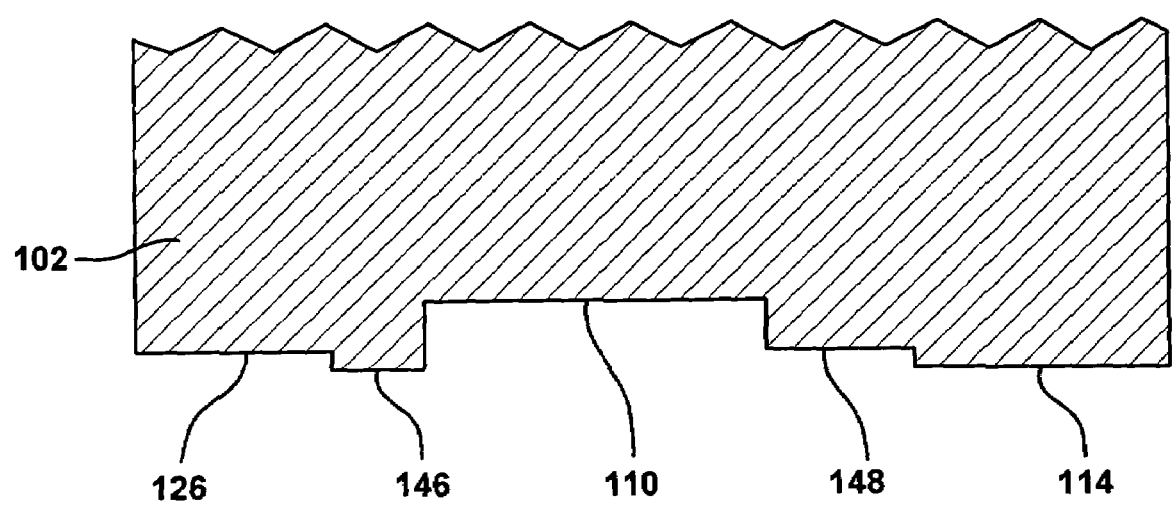
FIG. 3 is cross-sectional view of the head shown in FIG. 2, taken along the plane of cross-section designated as 3-3 in FIG. 2. For clarity, only the region of the cross-section near the air bearing surface is shown in FIG. 3 and the step heights are not to scale but rather exaggerated so as to be easily discernible.

Now referring to the exemplary embodiment shown in FIG. 2 and FIG. 3, head 100 comprises a transducer 104 for at least reading information from the disk. In certain embodiments, the transducer 104 is a merged thin film magnetic transducer comprising an inductive writer and magneto resistive read element. In such embodiments, the magneto resistive element may be a giant magneto resistive element (GMR) or tunneling magneto resistive element (TMR). In such embodiments, the writer may be a perpendicular magnetic recording (PMR) writer.

Head 100 also comprises a slider 102, which is typically fabricated from a ceramic material such as alumina titanium carbide. Slider 102 includes an air bearing surface 106, which may be formed on the surface of slider 102 by etching or ion milling and has a geometry that may be defined by use of a mask.

In the embodiment of FIG. 2 and FIG. 3, the air bearing surface 106 includes a central cavity 108 having a bottom surface 110. During operation, the central cavity 108 can develop a sub-ambient pressure region between the slider 102 and the surface of the disk 12 that can serve to reduce flying height sensitivity to changes in altitude.

In the embodiment of FIG. 2 and FIG. 3, the air bearing surface 106 also includes a leading pad 122 adjacent to the central cavity 108. During operation, the leading pad 122 can develop a super-ambient pressure region between the slider 102 and the surface of the disk 12 that can cause the slider to assume a positive pitch attitude characterized by a pitch angle in the range 50 micro radians to 200 micro radians.

In the embodiment of FIG. 2 and FIG. 3, the air bearing surface 106 also includes a trailing center pad 112 having a top surface 114 and an aft region 116 adjacent to the transducer 104. During operation, the trailing center pad 112 can develop a super-ambient pressure region between the top surface 114 and the surface of the disk 12 that can help maintain the flying height at the location of transducer 104 to be in the range 2.5 nanometers to 15 nanometers.

In the embodiment of FIG. 2 and FIG. 3, the trailing center pad 112 includes three projections 118 extending from the aft region 116 towards the central cavity 108. In this embodiment, the three projections 118 do not extend all the way to the leading pad 122. During operation, the relative lengths of the three projections 118 can influence, and in some embodiments substantially determine, the flatness of the flying height profile from the ID of the disk 12 to the OD of the disk 12. In one embodiment, the lengths of the three projections 118 range from 25 microns to 250 microns. In one embodiment, the longest of the three projections 118 exceeds the shortest of the three projections 118 by a difference that is less than 225 microns.

In the embodiment of FIG. 2 and FIG. 3, the air bearing surface 106 also includes two inter-projection step surfaces 120, each lying at least partially between the projections 118, and each lying at an intermediate level between a level of said top surface 114 and a level of said bottom surface 110. In one embodiment, the intermediate level is recessed from the top surface 114 by 50 to 200 nanometers. During operation, the inter-projection step surfaces 120 can serve as part of a vertically converging channel to help develop super-ambient pressure between the top surface 114 and the surface of the disk 12. Such enhanced pressurization may reduce the surface area required for top surface 114 of trailing center pad 12. Reduced surface area can, in turn, decrease flying height sensitivity to crown (and sometimes also to camber). In one embodiment, the surface area of trailing center pad 112 ranges from 10,000 microns squared to 25,000 microns squared.

In certain embodiments, the air bearing surface 106 may also include a leading step region 124 that is adjacent to the leading pad 122 so that the leading pad 122 lies between the leading step region 124 and the central cavity 108. In such embodiments, the leading step region 124 may have a surface 126 at or near the intermediate level. During operation, the leading step region 124 can serve as part of a vertically converging channel to help develop super-ambient pressure between the leading pad 122 and the surface of the disk 12.

In certain embodiments, the air bearing surface 106 may also include two side rails 128, each adjacent to the central cavity 108 and each projecting from the leading pad 122 and each having a surface at the intermediate level. During operation, the side rails 128 can serve to bound and enhance the sub-ambient pressure developed in the central cavity 108, and to shift a region of sub-ambient pressure rearward (towards the trailing edge of the slider). Such a shift can facilitate lifting off the slider from the disk surface dynamically, during operation. In one embodiment the side rails project rearward from the leading pad 122 by 30 to 150 microns.

In certain embodiments, the air bearing surface 106 may also include an ID-side trailing channel 130 having a surface at or near the level of the bottom surface 110, an ID-side trailing pad 132 separated from the trailing center pad 112 by the ID-side trailing channel 130, an ID-side leading step region 134 adjacent to the ID-side trailing pad 132, the ID-side leading step region 134 having a surface at the intermediate level, and an ID-side trailing step region 136 adjacent to the ID-side trailing pad 132, the ID-side trailing step region 136 having a surface at the intermediate level. During operation, the ID-side side trailing pad 132 can serve to enhance the effective stiffness of the air bearing to resist changes in roll attitude, and the ID-side leading step region 134 can serve as part of a vertically converging channel to help develop super-ambient pressure between ID-side side trailing pad 132 and the disk 12.

In certain embodiments, the air bearing surface 106 may also include an OD-side trailing channel 138 having a surface at or near the level of the bottom surface 110, an OD-side trailing pad 140 separated from the trailing center pad 112 by the OD-side trailing channel 138, an OD-side leading step region 142 adjacent to the OD-side trailing pad 140, the OD-side leading step region 142 having a surface at the intermediate level, and an OD-side trailing step region 144 adjacent to the OD-side trailing pad 140, the OD-side trailing step region 144 having a surface at the intermediate level. During operation, the OD-side side trailing pad 140 can serve to enhance the effective stiffness of the air bearing to resist changes in roll attitude, and the OD-side leading step region 142 can serve as part of a vertically converging channel to help develop super-ambient pressure between OD-side trailing pad 140 and the disk 12.

In the foregoing specification, the invention is described with reference to specific exemplary embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The terms "comprising," "including," and "having," as used herein, are specifically intended to be read as open-ended terms of art.

What is claimed is:

1. A head for use with a disk that can store information, the head comprising:
    a transducer for at least reading information from the disk;
    a slider having an air bearing surface, the air bearing surface comprising
        a central cavity having a bottom surface;
        a leading pad adjacent to the central cavity;
        a trailing center pad having a top surface, the trailing center pad having an aft region adjacent to the transducer and three projections extending from the aft region towards the central cavity, the central cavity separating the three projections from the leading pad;
        two inter-projection step surfaces, each lying at least partially between the projections, and each lying at an intermediate level between a level of said top surface and a level of said bottom surface;
        an ID-side trailing channel having a surface at the level of said bottom surface;
        an ID-side trailing pad separated from the trailing center pad by the ID-side trailing channel;
        an ID-side leading step region adjacent to the ID-side trailing pad, the ID-side leading step region having a surface at the intermediate level; and
        an ID-side trailing step region adjacent to the ID-side trailing pad, the ID-side trailing step region having a surface at the intermediate level.

2. The head of claim 1 wherein the air bearing surface further comprises:
    a leading step region that is adjacent to the leading pad so that the leading pad lies between the leading step region and the central cavity, the leading step region having a surface at the intermediate level; and
    two side rails, each adjacent to the central cavity and each projecting from the leading pad and each having a surface at the intermediate level.

3. The head of claim 1 wherein the air bearing surface further comprises:
    an OD-side trailing channel having a surface at the level of said bottom surface;
    an OD-side trailing pad separated from the trailing center pad by the OD-side trailing channel;
    an OD-side leading step region adjacent to the OD-side trailing pad, the OD-side leading step region having a surface at the intermediate level; and
    an OD-side trailing step region adjacent to the OD-side trailing pad, the OD-side trailing step region having a surface at the intermediate level.

4. A head for use with a disk that can store information, the head comprising:
    a transducer for at least reading information from the disk;
    a slider having an air bearing surface, the air bearing surface comprising
        a central cavity having a bottom surface;
        a leading pad adjacent to the central cavity;
        a trailing center pad having a top surface, the trailing center pad having an aft region adjacent to the transducer and three projections extending from the aft region towards the central cavity, the central cavity separating the three projections from the leading pad; and
        two inter-projection step surfaces, each lying at least partially between the projections, and each lying at an intermediate level between a level of said top surface and a level of said bottom surface;
    wherein the three projections each have a length in the range 25 microns to 250 microns.

5. A head for use with a disk that can store information, the head comprising:
    a transducer for at least reading information from the disk;
    a slider having an air bearing surface, the air bearing surface comprising
        a central cavity having a bottom surface;
        a leading pad adjacent to the central cavity;
        a trailing center pad having a top surface, the trailing center pad having an aft region adjacent to the transducer and three projections extending from the aft region towards the central cavity, the central cavity separating the three projections from the leading pad; and two inter-projection step surfaces, each lying at least partially between the projections, and each lying at an intermediate level between a level of said top surface and a level of said bottom surface;

wherein a longest of the three projections exceeds a shortest of the three projections by a length difference that is less than 225 microns.

6. An information storage device comprising:

a disk that can store information;

a transducer for at least reading information from the disk;

a slider having an air bearing surface, the air bearing surface comprising a central cavity having a bottom surface;

a leading pad adjacent to the central cavity;

a trailing center pad having a top surface, the trailing center pad having an aft region adjacent to the transducer and three projections extending from the aft region towards the central cavity, the central cavity separating the three projections from the leading pad;

two inter-projection step regions, each lying at least partially between the projections, and each including a surface at an intermediate level between a level of said top surface and a level of said bottom surface;

an ID-side trailing channel having a surface at the level of said bottom surface;

an ID-side trailing pad separated from the trailing center pad by the ID-side trailing channel;

an ID-side leading step region adjacent to the ID-side trailing pad, the ID-side leading step region having a surface at the intermediate level; and an ID-side trailing step region adjacent to the ID-side trailing pad, the ID-side trailing step region having a surface at the intermediate level.

7. The information storage device of claim 6 wherein the air bearing surface further comprises:

a leading step region that is adjacent to the leading pad so that the leading pad lies between the leading step region and the central cavity, the leading step region having a surface at the intermediate level; and two side rails, each adjacent to the central cavity and each projecting from the leading pad and each having a surface at the intermediate level.

8. The information storage device of claim 6 wherein the disk has a diameter less than approximately 50 mm.

9. The information storage device of claim 6 wherein the air bearing surface further comprises:

an OD-side trailing channel having a surface at the level of said bottom surface;

an OD-side trailing pad separated from the trailing center pad by the OD-side trailing channel;

an OD-side leading step region adjacent to the OD-side trailing pad, the OD-side leading step region having a surface at the intermediate level; and an OD-side trailing step region adjacent to the OD-side trailing pad, the OD-side trailing step region having a surface at the intermediate level.

10. An information storage device comprising:

a disk that can store information;

a transducer for at least reading information from the disk;

a slider having an air bearing surface, the air bearing surface comprising a central cavity having a bottom surface;

a leading pad adjacent to the central cavity;

a trailing center pad having a top surface, the trailing center pad having an aft region adjacent to the transducer and three projections extending from the aft region towards the central cavity, the central cavity separating the three projections from the leading pad; and two inter-projection step regions, each lying at least partially between the projections, and each including a surface at an intermediate level between a level of said top surface and a level of said bottom surface;

wherein the three projections each have a length in the range 25 microns to 250 microns.

11. An information storage device comprising:

a disk that can store information;

a transducer for at least reading information from the disk;

a slider having an air bearing surface, the air bearing surface comprising a central cavity having a bottom surface;

a leading pad adjacent to the central cavity;

a trailing center pad having a top surface, the trailing center pad having an aft region adjacent to the transducer and three projections extending from the aft region towards the central cavity, the central cavity separating the three projections from the leading pad; and two inter-projection step regions, each lying at least partially between the projections, and each including a surface at an intermediate level between a level of said top surface and a level of said bottom surface;

wherein a longest of the three projections exceeds a shortest of the three projections by a length difference that is less than 225 microns.

* * * * *